(12) United States Patent
Jung

(10) Patent No.: US 8,560,751 B2
(45) Date of Patent: Oct. 15, 2013

(54) MEMORY CARD, MEMORY CARD READER AND MEMORY CARD SYSTEM

(75) Inventor: Hong-Jip Jung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 635 days.

(21) Appl. No.: 12/713,462

(22) Filed: Feb. 26, 2010

(65) Prior Publication Data

US 2010/0223412 A1 Sep. 2, 2010

(30) Foreign Application Priority Data

Mar. 2, 2009 (KR) ........................ 10-2009-0017512

(51) Int. Cl.
*H05K 7/10* (2006.01)
*G06F 13/00* (2006.01)

(52) U.S. Cl.
USPC .......................................... 710/301; 710/316

(58) Field of Classification Search
USPC ................................................ 710/301, 316
See application file for complete search history.

(56) References Cited

U.S. PATENT DOCUMENTS

| 7,114,030 B2 | 9/2006 | Teicher et al. |
| 7,254,650 B2 | 8/2007 | Lin et al. |
| 2004/0059860 A1* | 3/2004 | Liu et al. ........................ 710/313 |
| 2004/0070952 A1* | 4/2004 | Higuchi et al. ................ 361/737 |
| 2005/0251593 A1* | 11/2005 | Lin et al. ........................... 710/62 |
| 2009/0221234 A1* | 9/2009 | Pirzada et al. ................ 455/41.2 |
| 2010/0064090 A1* | 3/2010 | Learmonth et al. ........... 710/316 |

FOREIGN PATENT DOCUMENTS

| JP | 2002-074277 | 3/2002 |
| KR | 1020010048173 A | 6/2001 |

\* cited by examiner

*Primary Examiner* — Nimesh G Patel
(74) *Attorney, Agent, or Firm* — Myers Bigel Sibley & Sajovec, P.A.

(57) ABSTRACT

A memory card includes a connector unit, an external switch, a mode switch, a processing unit, and at least one memory. The connector unit includes a plurality of connector pins. The external switch generates a mode switching signal. The mode switch selectively couples at least one connector pin of the plurality of connector pins to a memory card path or a wired universal serial bus (USB) path in response to the mode switching signal. The processing unit includes a memory card interface unit coupled to the memory card path and a wired USB interface unit coupled to the wired USB path, and selectively operates the memory card interface unit or the wired USB interface unit in response to the mode switching signal. The at least one memory stores data received through the connector unit. Therefore, the memory card may perform a cable association for a wireless universal serial bus (WUSB) communication.

14 Claims, 6 Drawing Sheets

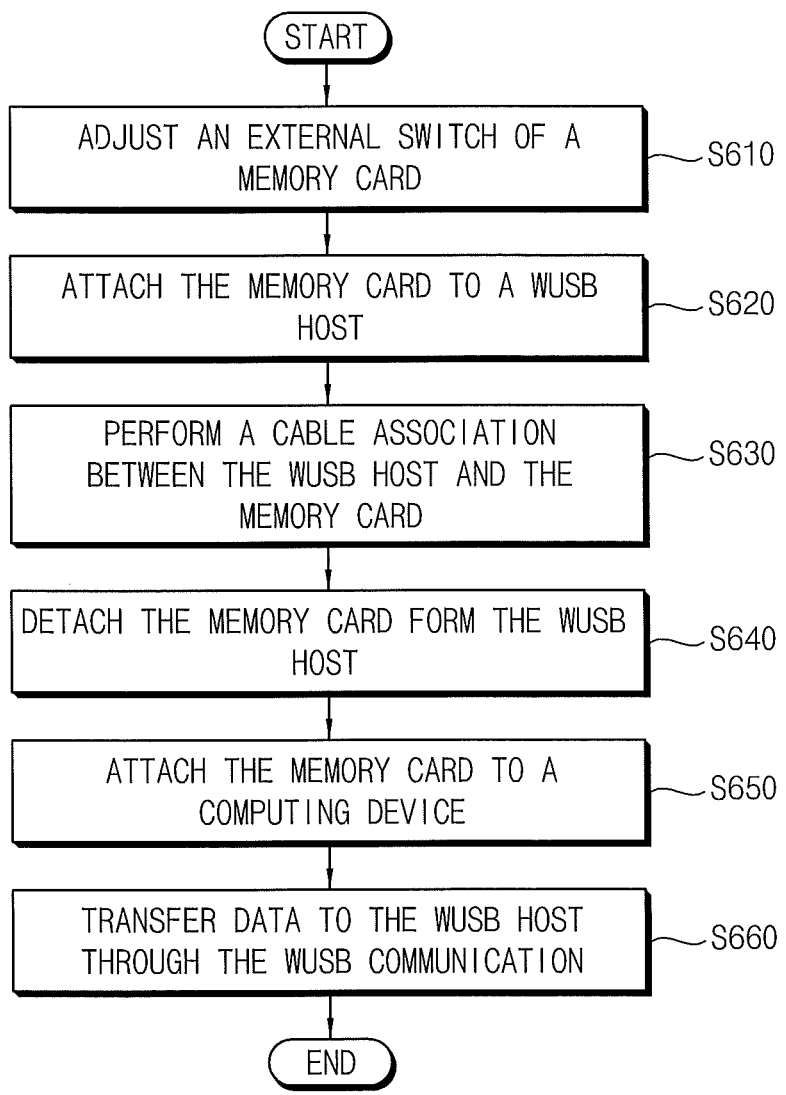

MEMORY CARD, MEMORY CARD READER AND MEMORY CARD SYSTEM

CROSS-REFERENCE TO RELATED APPLICATION

This application claims priority under 35 USC §119 to Korean Patent Application No. 2009-0017512, filed on Mar. 2, 2009, in the Korean Intellectual Property Office (KIPO), the contents of which are incorporated herein in by reference in their entirety.

BACKGROUND

1. Technical Field

Example embodiments relate generally to a memory card, and, more particularly to a memory card that performs a cable association for a wireless universal serial bus (WUSB) communication, a memory card reader, and a memory card system 2. Description of the Related Art A memory card may be installed in a computing device, such as a digital camera, a computer, a notebook, a handheld computer, a music player, a game machine, a mobile phone, a smart phone, a personal digital assistant (PDA), a portable multimedia player (PMP), etc., to store data. The memory card may store data from a first computing device when the memory card is attached to the first computing device, and the memory card may transfer the stored data to a second computing device when the memory card is attached to the second computing device.

To transfer the data from the first computing device to the second computing device by means of a conventional memory card, the memory card may be moved from the first computing device to the second computing device, or be coupled to the second computing device through a wired universal serial bus (USB) cable.

SUMMARY

Example embodiments provide a memory card that is operable to perform a cable association for a wireless universal serial bus (WUSB) communication.

Example embodiments provide a memory card reader that supports a wired USB mode for a cable association.

Example embodiments provide a memory card system that is operable to perform a WUSB communication.

According to some example embodiments, a memory card includes a connector unit, an external switch, a mode switch, a processing unit and at least one memory.

The connector unit includes a plurality of connector pins. The external switch generates a mode switching signal. The mode switch selectively couples at least one connector pin of the plurality of connector pins to a memory card path or to a wired universal serial bus (USB) path in response to the mode switching signal. The processing unit includes a memory card interface unit coupled to the memory card path and a wired USB interface unit coupled to the wired USB path, and selectively operates the memory card interface unit or the wired USB interface unit in response to the mode switching signal. The at least one memory stores data received through the connector unit.

In some embodiments, the processing unit may perform a cable association for a wireless universal serial bus (WUSB) communication with a WUSB host by operating the wired USB interface unit while the memory card is attached to the WUSB host.

In some embodiments, the processing unit may perform the WUSB communication to transfer the data stored in the at least one memory to the WUSB host while the memory card is attached to a computing device.

In some embodiments, the processing unit may further include a WUSB unit configured to perform the WUSB communication.

In some embodiments, the processing unit may generate a connection context by performing the cable association, and may store the connection context in the at least one memory.

In some embodiments, the processing unit may perform data encryption and data decryption using the connection context stored in the at least one memory when the processing unit performs the WUSB communication with the WUSB host.

In some embodiments, the connection context may include a connection host ID, a connection device ID and a connection key.

In some embodiments, the processing unit may further include an internal memory configured to store memory card firmware for operating the memory card interface unit and wired USB firmware for operating the wired USB interface unit.

In some embodiments, the processing unit may further include a register configured to store the mode switching signal received from the external switch. The register may include a general purpose input/output (GPIO) register.

In some embodiments, the memory card interface unit may include a secure digital (SD) interface unit.

In some embodiments, the connector pins may include a first data pin, a second data pin, a third data pin, a fourth data pin, a command pin, a clock pin, a power supply voltage pin, a first ground voltage pin and a second ground voltage pin.

In some embodiments, the at least one connector pin may include the first data pin and the second data pin.

In some embodiments, the external switch may include a switch tab, may generate the mode switching signal indicating a memory card mode when the switch tab is located at a first position, and may generate the mode switching signal indicating a wired USB mode when the switch tab is located at a second position.

In some embodiments, the mode switch may couple the at least one connector pin to the memory card path in response to the mode switching signal indicating the memory card mode, and the processing unit may operate the memory card interface unit in response to the mode switching signal indicating the memory card mode.

In some embodiments, the mode switch may couple the at least one connector pin to the wired USB path in response to the mode switching signal indicating the wired USB mode, and the processing unit may operate the wired USB interface unit in response to the mode switching signal indicating the wired USB mode.

According to some example embodiments, a memory card reader includes a host connector unit, a memory card connector unit, an external switch, a converting unit and a switching unit.

The host connector unit includes a plurality of host connector pins coupled to a host device. The memory card connector unit includes a plurality of memory card connector pins coupled to a memory card. The external switch generates a mode switching signal. The converting unit converts a wired USB signal into a memory card signal, and to convert the memory card signal into the wired USB signal. The switching unit selectively couples at least one host connector pin of the plurality of host connector pins and at least one memory card connector pin of the plurality of memory card connector pins to each other or to the converting unit in response to the mode switching signal.

In some embodiments, the switching unit may include a first switch configured to selectively couple the at least one host connector pin to a second switch or to the converting unit in response to the mode switching signal, and the second switch configured to selectively couple the at least one memory card connector pin to the first switch or to the converting unit in response to the mode switching signal.

According to some example embodiments, a memory card system includes a WUSB host, a computing device and a memory card.

The WUSB host performs a WUSB communication. The memory card performs a cable association with the WUSB host for the WUSB communication when the memory card is attached to the WUSB host, receives data from the computing device when the memory card is attached to the computing device, and transfers the received data to the WUSB host through the WUSB communication while the memory card is attached to the computing device.

In some embodiments, the memory card system may further include a memory card reader coupled between the WUSB host and the memory card when the memory card is attached to the WUSB host, and configured to connect the WUSB host to the memory card through a wired USB interface.

According to some example embodiments, the memory card, the memory card reader and the memory card system may perform a cable association for the WUSB communication. Further, according to some example embodiments, the memory card, the memory card reader and the memory card system may be easily implemented with minimum hardware/software design change.

BRIEF DESCRIPTION OF THE DRAWINGS

Illustrative, non-limiting example embodiments will be more clearly understood from the following detailed description taken in conjunction with the accompanying drawings.

FIG. 7 is a flow chart illustrating operations of a memory card system of FIG. 6 according to some example embodiments of the present inventive subject matter,

DETAILED DESCRIPTION OF THE EMBODIMENTS

Figure 1:
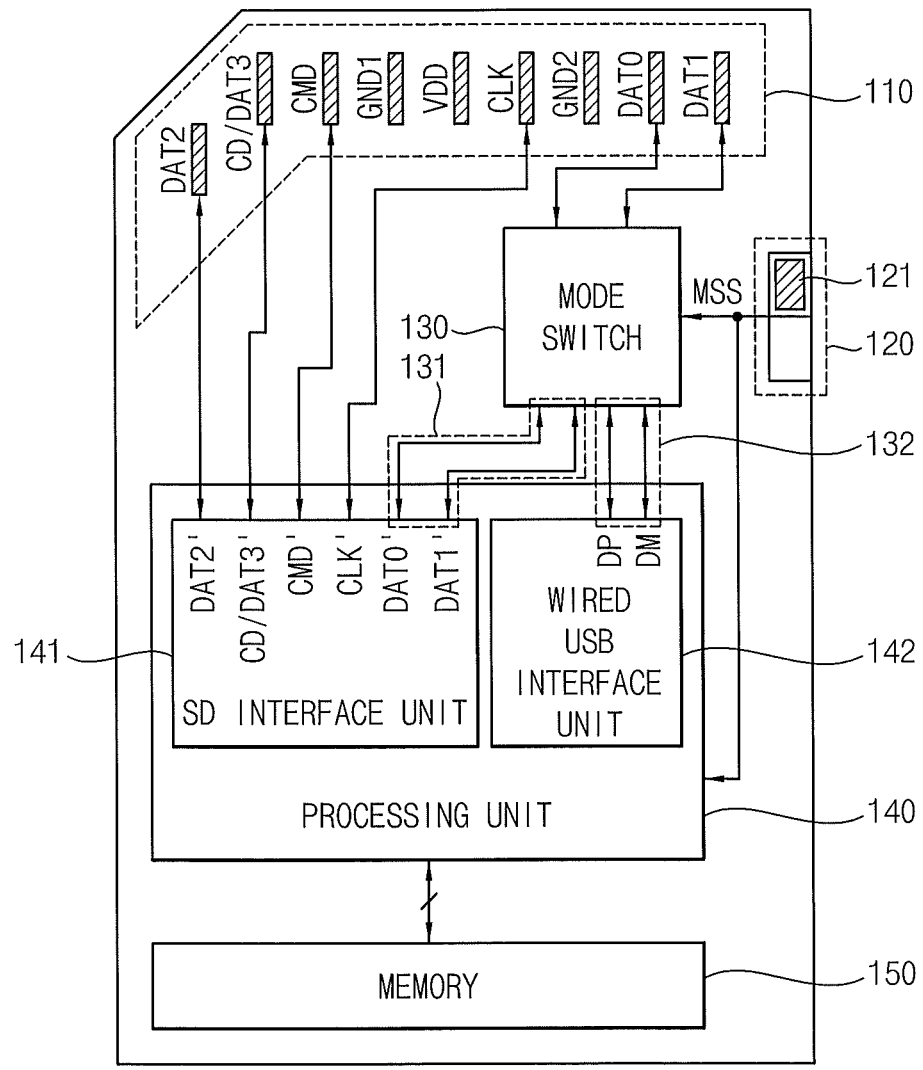
FIG. 1 is block diagram illustrating a memory card according to some example embodiments of the present inventive subject matter.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of elements may be exaggerated for clarity. Like numerals refer to like elements throughout the description of the figures.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is block diagram illustrating a memory card according to some example embodiments of the present inventive subject matter.

Referring to FIG. 1, a memory card 100 includes a connector unit 110, an external switch 120, a mode switch 130, a processing unit 140 and at least one memory 150.

When the memory card 100 is coupled to a wireless universal serial bus (WUSB) host, the memory card 100 may perform a cable association for a WUSB communication with the WUSB host. After the cable association with the WUSB host, the memory card 100 may be detached from the WUSB host and may be attached to a computing device. The memory card 100 when attached to the computing device may transfer data from the computing device to the WUSB host through the WUSB communication.

The connector unit 110 may be coupled to the computing device or the WUSB host when the memory card 100 is attached to the computing device or the WUSB host. The connector unit 110 may include a plurality of connector pins DAT2, CD/DAT3, CMD, GND1, VDD, CLK, GND2, DAT0 and DAT1 coupled to the computing device or the WUSB host. In some embodiments, the connector unit 110 may include a first data pin DAT0, a second data pin DAT1, a third data pin DAT2, a fourth data pin CD/DAT3, a command pin CMD, a clock pin CLK, a power supply voltage pin VDD, a first ground voltage pin GND1, and a second ground voltage pin GND2. The fourth data pin CD/DAT3 may be used as a data pin or a card detection pin.

The external switch 120 generates a mode switching signal MSS. The external switch 120 may be exposed to the outside and may be controlled from the outside. The external switch 120 may be a manual electric switch. In some embodiments, the memory card 100 may be a secure digital (SD) card, and the external switch 120 may be a write protection (WP) switch.

The external switch 120 may include a switch tab 121 controlled from the outside. The external switch 120 may generate the mode switching signal MSS having different levels according to positions of the switch tab 121. For example, when the switch tab 121 is located at a first position, the external switch 120 may generate the mode switching signal MSS having a first logic level, which indicates a memory card mode. When the switch knob 121 is located at a second position, the external switch 120 may generate the mode switching signal MSS having a second logic level, which indicates a wired USB mode.

The mode switch 130 is coupled to at least one connector pin DAT0 and DAT1 of the plurality of connector pins DAT2, CD/DAT3, CMD, GND1, VDD, CLK, GND2, DAT0, and DAT1. The mode switch 130 may selectively couple the at least one connector pin DAT0 and DAT1 to a memory card path 131 or to a wired USB path 132 in response to the mode switching signal MSS. For example, when the mode switching signal MSS has the first logic level indicating the memory card mode, the mode switch 130 may couple the at least one connector pin DAT0 and DAT1 to the memory card path 131. When the mode switching signal MSS has the second logic level indicating the wired USB mode, the mode switch 130 may couple the at least one connector pin DAT0 and DAT1 to the wired USB path 132.

The processing unit 140 includes a memory card interface unit 141 coupled to the memory card path 131 and a wired USB interface unit 142 coupled to the wired USB path 132. The processing unit 140 may selectively operate the memory card interface unit 141 or the wired USB interface unit 142 in response to the mode switching signal MSS. For example, when the mode switching signal MSS has the first logic level indicating the memory card mode, the processing unit 140 may operate the memory card interface unit 141. When the mode switching signal MSS has the second logic level indicating the wired USB mode, the processing unit 140 may operate the wired USB interface unit 142.

The memory card interface unit 141 may have a first data terminal DAT0' coupled to the first data pin DAT0 via the mode switch 130 and the memory card path 131, a second data terminal DAT1' coupled to the second data pin DAT1 via the mode switch 130 and the memory card path 131, a third data terminal DAT2' coupled to the third data pin DAT2, a fourth data terminal CD/DAT3' coupled to the fourth data pin CD/DAT3, a command terminal CMD' coupled to the command pin CMD and a clock terminal CLK' coupled to the clock pin CLK.

The wired USB interface unit 142 may have a positive data terminal DP coupled to the first data pin DAT0 via the mode switch 130 and the wired USB path 132 and a negative data terminal DM coupled to the second data pin DAT1 via the mode switch 130 and the wired USB path 132. While the positive data terminal DP and the negative data terminal DM of the wired USB interface unit 142 are illustrated in FIG. 1 as being coupled to the first data pin DAT0 and the second data pin DAT1, the positive data terminal DP and the negative data terminal DM may be coupled to any two pins of the first through the fourth data pins DAT0, DAT1, DAT2 and CD/DAT3.

The memory 150 may be controlled by the processing unit 140 and may store data received via the connector unit 110 from the computing device. In some embodiments, the memory 150 may comprise a nonvolatile memory. For example, the memory 150 may comprise a NAND flash memory.

The memory card 100 may perform a cable association for the WUSB communication. For example, if the switch tab 121 of the external switch 120 is located at the second position and the memory card 100 is attached to the WUSB host, the external switch 120 may generate the mode switching signal MSS indicating the wired USB mode, and the WUSB host may transfer positive data and negative data that are compatible with a wired USB interface to the first data pin DAT0 and the second data pin DAT1. The mode switch 130 may couple the first data pin DAT0 and the second data pin DAT1 to the wired USB path 132 in response to the mode switching signal MSS indicating the wired USB mode. The processing unit 140 may operate the wired USB interface unit 142 in response to the mode switching signal MSS indicating the wired USB mode. The positive data and the negative data are applied to the positive data terminal DP and the negative data terminal DM of the wired USB interface unit 142. The processing unit 140 may be connected to the WUSB host through the wired USB interface. The processing unit 140 may perform the cable association to generate a connection context with the WUSB host through the wired USB interface. The processing unit 140 may store the connection context in the memory 150. For example, the connection context may include a connection host ID, a connection device ID, and a connection key.

After the cable association, the memory card may be attached to the computing device. The processing unit 140 may store in the memory 150 data received via the connector unit 110 from the computing device. The memory card 100 may receive the data from the computing device through a memory card interface or the wired USB interface. For example, the mode switch 130 may couple the first data pin DAT0 and the second data pin DAT1 to the memory card path 131, and the processing unit 140 may receive the data from the computing device through the memory card interface by operating the memory card interface unit 141. In other examples, the mode switch 130 may couple the first data pin DAT0 and the second data pin DAT1 to the wired USB path 132, and the processing unit 140 may receive the data from the computing device through the wired USB interface by operating the wired USB interface unit 142. The processing unit 140 may store the received data in the memory 150.

When the memory card 100 is attached to the computing device, the processing unit 140 may transfer the data received from the computing device to the WUSB host by performing the WUSB communication. In some embodiments, the processing unit 140 may transfer the data from the computing device to the WUSB host without storing the data in the memory 150. In other embodiments, the processing unit 140 may store the data in the memory 150, and then may transfer the stored data to the WUSB host. The processing unit 140 may transfer the data to the WUSB host by using the connection context stored in the memory 150. In some embodiments, the processing unit 140 may perform data encryption and data decryption using the connection key stored in the memory 150 to prevent the data transferred through the WUSB communication from being extracted by devices other than the WUSB host with which the cable association is performed.

As described above, the memory card 100, according to some example embodiments, may perform the cable association for the WUSB communication. The memory card 100, according to some example embodiments, may be easily implemented with minimum hardware/software design change.

While the memory card interface unit 141 of FIG. 1 is illustrated as a SD card interface unit, the memory card 100 may comprise at least one of a multimedia card (MMC) interface unit, a memory stick interface unit, a compact flash (CF) card interface unit, a personal computer memory card international association (PCMCIA) card interface unit, a smart media (SM) card interface unit, a universal flash storage (UFS) interface unit, and an extreme digital-picture (xD-picture) card interface unit. While the connector unit 110 is illustrated in FIG. 1 as including nine connector pins DAT2, CD/DAT3, CMD, GND1, VDD, CLK, GND2, DAT0 and DAT1, the connector unit 110 may be implemented according to types and specifications of the memory card interface.

Figure 2:
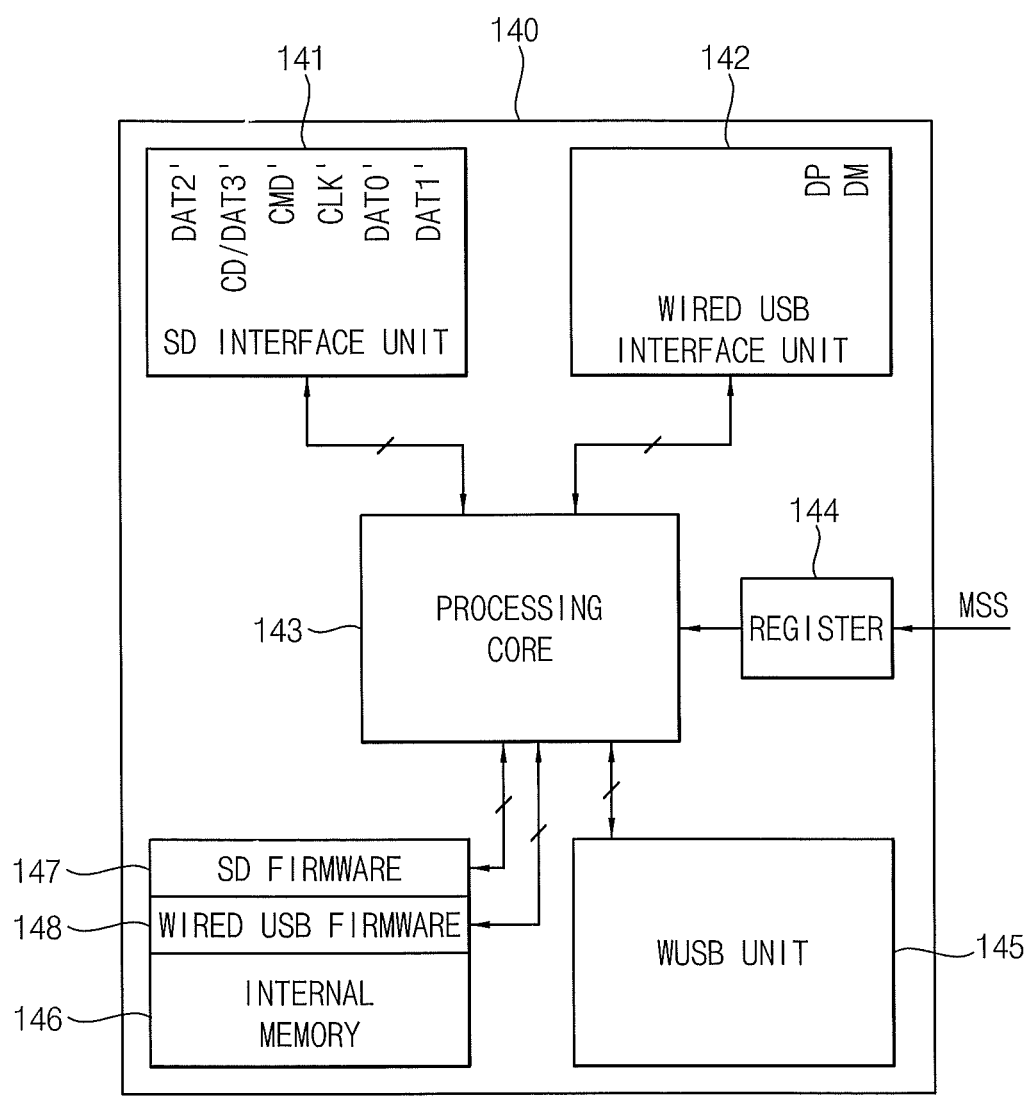
FIG. 2 is a block diagram illustrating a processing unit included in a memory card of FIG. 1.

FIG. 2 is a block diagram illustrating a processing unit included in a memory card of FIG. 1 according to some embodiments of the present inventive subject matter.

Referring to FIG. 2, a processing unit 140 comprises a memory card interface unit 141, a wired USB interface unit 142, a processing core 143, a register 144, a WUSB unit 145, and an internal memory 146. In some embodiments, the processing unit 140 may be implemented as a single chip. The processing unit 140 may be implemented as a system-on-chip (SoC).

The internal memory 146 may store memory card firmware 147 for operating the memory card interface unit 141 and wired USB firmware 148 for operating the wired USB interface unit 142. The internal memory 146 may store a device identification (ID) of a memory card including the processing unit 140. In some embodiments, the internal memory 146 may be a volatile memory, such as a static random access memory (SRAM) that loses stored data when power is not supplied. In this case, when a connection context for a WUSB communication is generated, the connection context is stored in the internal memory 146, and the connection context stored in the internal memory 146 is duplicated or moved to the memory 150 illustrated in FIG. 1. In some embodiments, the processing core 143 may load the memory card firmware 147 and the wired USB firmware 148 into the internal memory 146 by reading the memory card firmware 147 and the wired USB firmware 148 from the memory 150 illustrated in FIG. 1.

The register 144 may receive a mode switching signal MSS from an external switch 120 illustrated in FIG. 1, and may store the mode switching signal MSS. In some embodiments, the register 144 may be a general purpose input/output (GPIO) register.

The processing core 143 may read the mode switching signal MSS from the register 144, and may selectively operate the memory card interface unit 141 or the wired USB interface unit 142 in response to the read mode switching signal MSS. For example, if the mode switching signal MSS read from the register 144 has a first logic level indicating a memory card mode, the processing core 143 may operate the memory card interface unit 141 by using the memory card firmware 147 stored in the internal memory 146. If the mode switching signal MSS read from the register 144 has a second logic level that indicates a wired USB mode, the processing core 143 may operate the wired USB interface unit 142 by using the wired USB firmware 148 stored in the internal memory 146.

The memory card interface unit 141 may have a first data terminal DAT0', a second data terminal DAT1', a third data terminal DAT2', a fourth data terminal CD/DAT3', a command terminal CMD', and a clock terminal CLK'. The memory card 100 of FIG. 1 may communicate with an external device (e.g., a WUSB host or a computing device) through a memory card interface (e.g., a SD card interface) by using the memory card interface unit 141. The wired USB interface unit 142 may have a positive data terminal DP and a negative data terminal DM. The memory card 100 of FIG. 1 may communicate with the external device through a wired USB interface by using the wired USB interface unit 142. A cable association between the memory card 100 of FIG. 1 and the WUSB host may be performed through the wired USB interface. The processing core 143 may store a connection context including a connection host ID, a connection device ID, and a connection key generated by the cable association in the memory 150 illustrated in FIG. 1.

The WUSB unit 145 may perform the WUSB communication with the WUSB host. The processing core 143 may encrypt WUSB data to be transferred via the WUSB unit 145 to the WUSB host by using the connection key stored in the memory 150 illustrated in FIG. 1. The processing core 143 may decrypt WUSB data received via the WUSB unit 145 from the WUSB host by using the connection key stored in the memory 150 illustrated in FIG. 1. The memory card 100 of FIG. 1 may further include a radio frequency (RF) unit and an antenna for transmitting/receiving the WUSB data.

Figure 3:
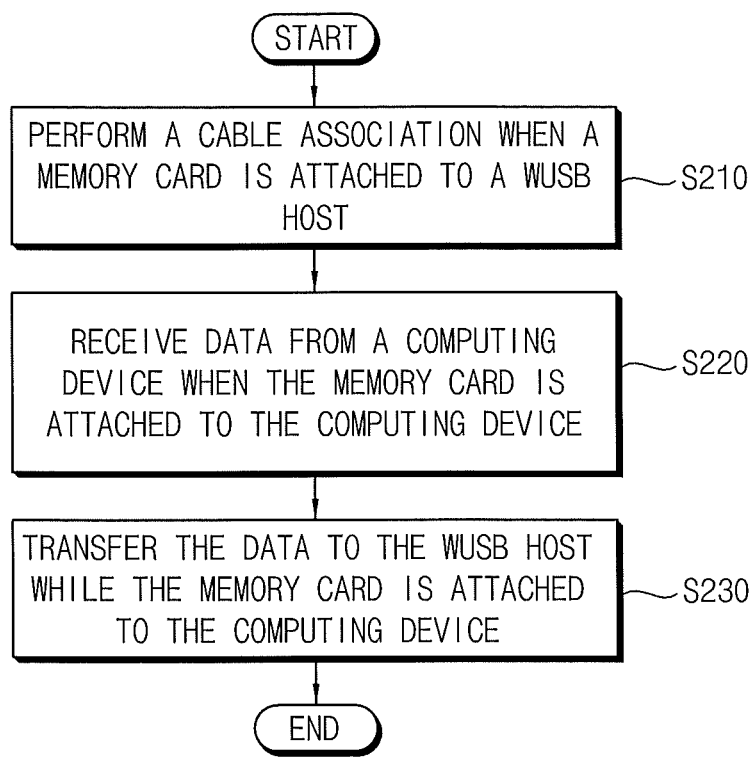
FIG. 3 is a flow chart illustrating operations of a memory card of FIG. 1 according to some example embodiments of the present inventive subject matter.

FIG. 3 is a flow chart illustrating operations of a memory card of FIG. 1 according to some embodiments of the present inventive subject matter.

Referring to FIGS. 1 to 3, when a memory card 100 is attached to a WUSB host, a processing unit 140 may perform a cable association by operating a wired USB interface unit 142 (block S210). For example, a user may slide a switch tab 121 of an external switch 120 to a second location, and may attach the memory card 100 to the WUSB host. The external switch 120 may generate a mode switching signal MSS indicating a wired USB mode. The mode switch 130 may couple a first data pin DAT0 and a second data pin DAT1 to a wired USB path 132 in response to the mode switching signal MSS indicating the wired USB mode. The processing unit 140 may operate a wired USB interface unit 142 in response to the mode switching signal MSS indicating the wired USB mode. The memory card 100 may perform a cable association with the WUSB host through a wired USB interface. After the cable association, the processing unit 140 may store a connection context including a connection host ID, a connection device ID and a connection key in a memory 150.

When the memory card 100 is detached from the WUSB host and attached to a computing device after the cable association, the memory card 100 may receive data from the computing device (block S220). For example, the user may slide the switch tab 121 of the external switch 120 to a first location, and may move the memory card 100 from the WUSB host to the computing device. The external switch 120 may generate the mode switching signal MSS indicating a memory card mode. The mode switch 130 may couple the first data pin DAT0 and the second data pin DAT1 to a memory card path 131 in response to the mode switching signal MSS indicating the memory card mode. The processing unit 140 may operate a memory card interface unit 141 in response to the mode switching signal MSS indicating the memory card mode. The memory card 100 may communicate with the computing device through a memory card interface. In other examples, the processing unit 140 may operate the wired USB interface unit 142, and the memory card 100 may communicate with the computing device through the wired USB interface.

The memory card 100 may transfer the data to the WUSB host through a WUSB communication while the memory card is attached to the computing device (block S230). The processing unit 140 may receive the data from the computing device, and may transfer the data to the WUSB host through the WUSB communication. The processing unit 140 may use the connection context stored in the memory 150 to transfer the data to the WUSB host with which the cable association is performed. For example, the processing unit 140 may perform data encryption and/or data decryption using the connection key stored in the memory 150 to protect the data transferred through the WUSB communication from being extracted by devices other than the WUSB host with which the cable association is performed.

Figure 4:
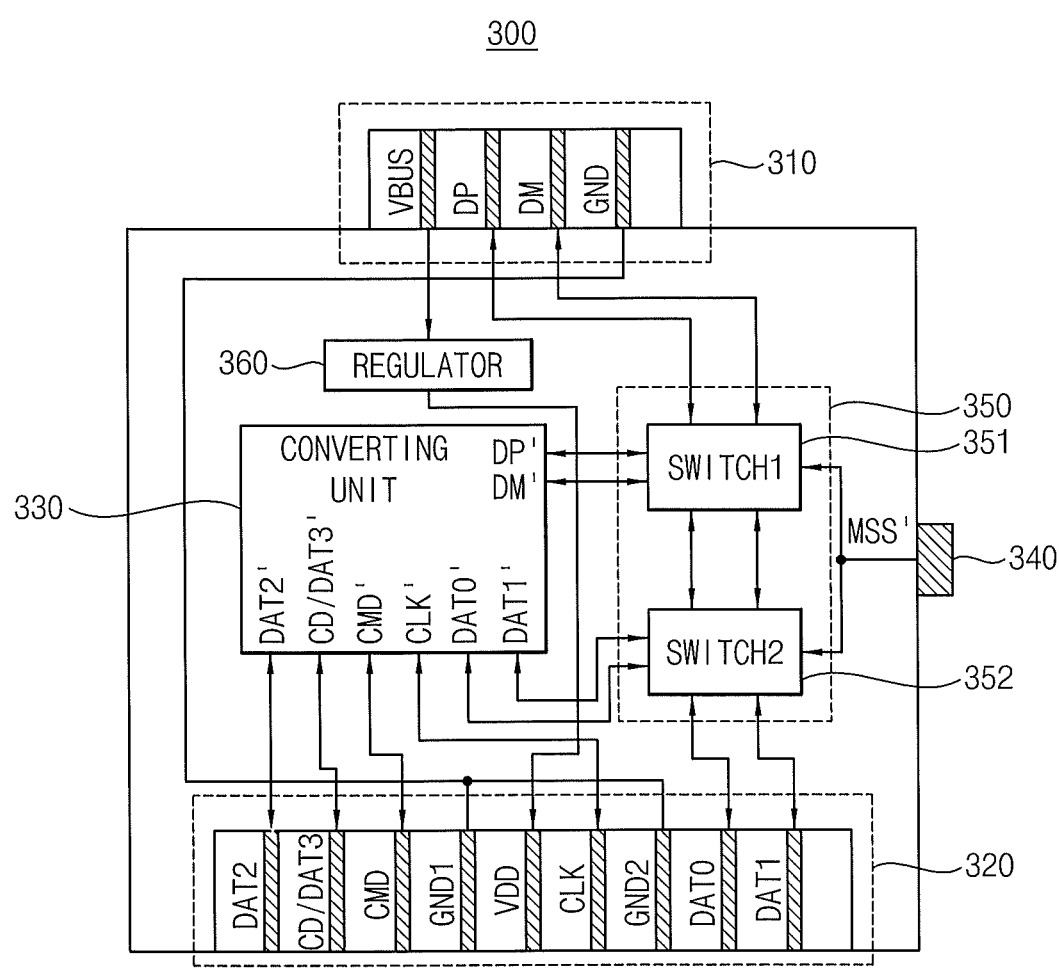
FIG. 4 is a block diagram illustrating a memory card reader according to some example embodiments of the present inventive subject matter.

FIG. 4 is a block diagram illustrating a memory card reader according to some example embodiments of the present inventive subject matter.

Referring to FIG. 4, a memory card reader 300 comprises a host connector unit 310, a memory card connector unit 320, a converting unit 330, an external switch 340 and a switching unit 350.

The memory card reader 300 may be connected between a host device and a memory card. The host device may be a WUSB host or a computing device having a wired USB port. The memory card may be a memory card 100 of FIG. 1. The memory card reader 300 may receive commands/data from the host device through a wired USB interface. The memory card reader 300 may transfer the commands/data to a memory card through the wired USB interface. Alternatively, the memory card reader 300 may convert the commands/data that are compatible with the wired USB interface into commands/data that are compatible with a memory card interface, and may transfer the converted commands/data to the memory card through the memory card interface.

The host connector unit 310 includes a plurality of host connector pins VBUS, DP, DM and GND coupled to the host device. The host unit 310 may include a power supply voltage pin VBUS, a positive data pin DP, a negative data pin DM and a ground voltage pin GND that are compatible with the wired USB interface.

The memory card connector unit 320 includes a plurality of memory card connector pins DAT2, CD/DAT3, CMD, GND1, VDD, CLK, GND2, DAT0 and DAT1 coupled to the memory card. The memory card connector unit 320 may include a first data pin DAT0, a second data pint DAT1, a third data pin DAT2, a fourth data pin CD/DAT3, a command pin CMD, a clock pin CLK, a power supply voltage pin VDD, a first ground voltage pin GND1, and a second ground voltage pin GND2 that are compatible with the memory card interface.

The power supply voltage pin VBUS of the host connector unit 310 may be coupled to the power supply voltage pin VDD of the memory card connector unit 320. In some embodiments, the memory card reader 300 may further include a regulator 360. The regulator 360 may adjust a level of a power supply voltage provided via the host connector unit 310, and may provide the power supply voltage having the adjusted level via the memory card connector unit 320. The ground voltage pin GND of the host connector unit 310 may be coupled to the first ground voltage pin GND1 and the second ground voltage pin GND2 of the memory card connector unit 320.

The converting unit 330 may be selectively coupled to the host connector unit 310 and the memory card connector unit 320 by the switching unit 350. When the converting unit 330 is coupled to the host connector unit 310 and the memory card connector unit 320, the converting unit 330 may convert a wired USB signal (i.e., a signal compatible with the wired USB interface) received via the host connector unit 310 into a memory card signal (i.e., a signal compatible with the memory card interface) to be transmitted via the memory card connector unit 320. Further, the converting unit 330 may convert the memory card signal received via the memory card connector unit 320 into the wired USB signal to be transmitted via the host connector unit 310.

The converting unit 330 may include a positive data terminal DP' and a negative data terminal DM' that are selectively coupled to the positive data pin DP and the negative data pin DM of the host connector unit 310 by the switching unit 350. The converting unit 330 may further include a first data terminal DAT0' selectively coupled to the first data pin DAT0 via the switching unit 350, a second data terminal DAT1' selectively coupled to the second data pin DAT1 via the switching unit 350, a third data terminal DAT2' coupled to the third data pin DAT2, a fourth data terminal CD/DAT3' coupled to the fourth data pin CD/DAT3, a command terminal CMD' coupled to the command pin CMD, and a clock terminal CLK' coupled to the clock pin CLK.

The external switch 340 may generate a mode switching signal MSS'. The external switch 340 may be exposed to the outside and be controlled from the outside. In some embodiments, the external switch 340 may be a manual electric switch, a dual in-line package (DIP) switch, a push-pull type switch or the like. The mode switching signal MSS' may have a first logic level, which indicates a memory card mode, or a second logic level, which indicates a wired USB mode.

The switching unit 350 may receive the mode switching signal MSS' from the external switch 340. The switching unit 350 may couple at least one host connector pin DP and DM and at least one memory card connector pin DAT0 and DAT1 to each other or to the converting unit 330 in response to the mode switching signal MSS'.

For example, if the mode switching signal MSS' has the first logic level indicating the memory card mode, the switching unit 350 may couple the at least one host connector pin DP and DM to the converting unit 330, and may couple the at least one memory card connector pin DAT0 and DAT1 to the converting unit 330. Thus, in the memory card mode, the converting unit 330 may convert the wired USB signal received from the host device into the memory card signal to be transmitted to the memory card, and may convert the memory card signal received from the memory card into the wired USB signal to be transmitted to the host device.

If the mode switching signal MSS' has the second logic level indicating the wired USB mode, the switching unit 350 may couple the at least one host connector pin DP and DM to the at least one memory card connector pin DAT0 and DAT1. Thus, in the wired USB mode, the wired USB signal received from the host device may be transmitted to the memory card without the conversion, and the wired USB signal received from the memory card may be transmitted to the host device without the conversion.

The switching unit 350 may include a first switch 351 and a second switch 352. The first switch 351 may selectively couple the at least one host connector pin DP and DM to the converting unit 330 or to the second switch 352 in response to the mode switch signal MSS'. The second switch 352 may selectively couple the at least one memory card connector pin DAT0 and DAT1 to the converting unit 330 or to the first switch 351 in response to the mode switch signal MSS'.

For example, in the memory card mode, the first switch 351 may couple the at least one host connector pin DP and DM to the converting unit 330, and the second switch 352 may couple the at least one memory card connector pin DAT0 and DAT1 to the converting unit 330. The converting unit 330 may convert data compatible with the wired USB interface, which are received at the positive data terminal DP' and the negative data terminal DM' via the first switch 351 from the host device, into data compatible with the memory card interface, which are output at the first data terminal DAT0', the second data terminal DAT1', the third data terminal DAT2' and the fourth data terminal CD/DAT3'. The data output at the first data terminal DAT0' and the second output terminal DAT1' are applied via the second switch 352 to the memory card connector unit 320, and the data output at the third data terminal DAT2' and the fourth output terminal CD/DAT3' are directly applied to the memory card connector unit 320. Further, the converting unit 330 may convert data compatible with the memory card interface, which are received at the first data terminal DAT0', the second data terminal DAT1', the third data terminal DAT2' and the fourth data terminal CD/DAT3' from the memory card, into data compatible with the wired USB interface, which are output at the positive data terminal DP' and the negative data terminal DM'. The data output at the positive data terminal DP' and the negative data terminal DM' are applied via the first switch 351 to the host device. Accordingly, the memory card reader 300 may connect the host device performing a wired USB communication with the memory card performing a memory card communication.

In the wired USB mode, the first switch 351 and the second switch 352 are coupled to each other. The data received through the positive data pin DP and the negative data pin DM from the host device are transmitted via the first switch 351, the second switch 352 and the memory card connector unit 320 to the memory card without the conversion. The data received through the first data pin DAT0 and the second data pin DAT1 from the memory card may be transmitted via the second switch 352, the first switch 351 and the host connector unit 310 to the host device without the conversion. Accordingly, the memory card reader 300 may connect the host device performing the wired USB communication with the memory card performing the wired USB communication.

As described above, the memory card reader 300, according to some example embodiments, may connect the host device performing the wired USB communication with the memory card performing the memory card communication or the wired USB communication. Further, the memory card reader 300 according to some example embodiments may support the wired USB mode to enable the memory card to perform a cable association with the host device. In addition, the memory card reader 300 according to some example embodiments may be easily implemented with minimum hardware/software design change.

Figure 5:
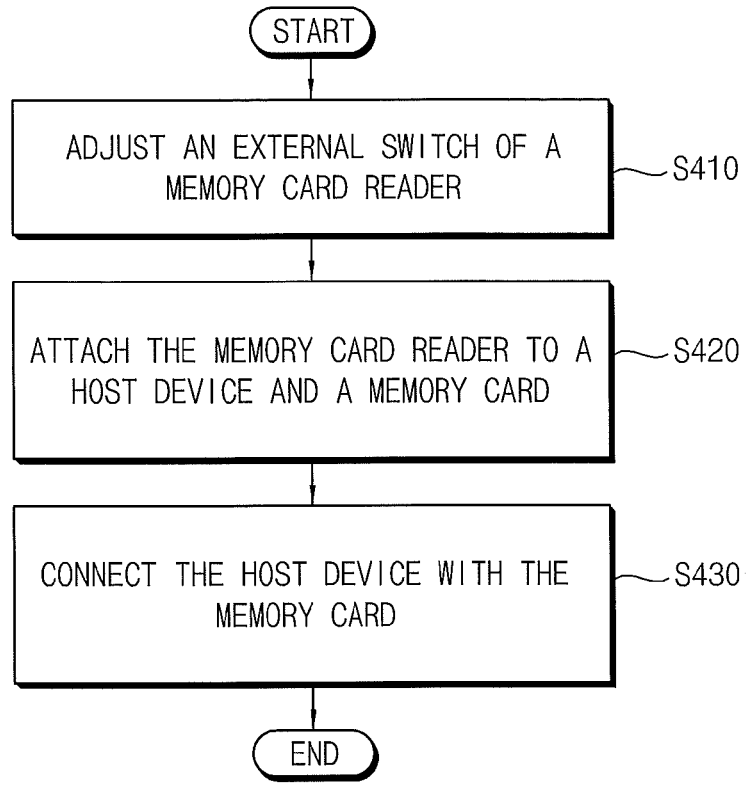
FIG. 5 is a flow chart illustrating operations of a memory card reader of FIG. 4 according to some example embodiments of the present inventive subject matter.

FIG. 5 is a flow chart illustrating operations of a memory card reader of FIG. 4 according to some embodiments of the present inventive subject matter.

Referring to FIGS. 4 and 5, an external switch 340 of a memory card reader 300 may be adjusted (block S410). For example, if a cable association between a host device and a memory card is required, the external switch 340 may be adjusted to generate a mode switching signal MSS' indicating a wired USB mode. The host device may be a WUSB host or a computing device having a wired USB port, and the memory card may be a memory card 100 of FIG. 1.

A host connector unit 310 of the memory card reader 300 may be attached to the host device and a memory card connector unit 320 of the memory card reader 300 may be attached to the memory card (block S420).

The memory card reader 300 may connect the host device with the memory card (block S430). For example, if the mode switching signal MSS' indicates the wired USB mode, the switching unit 350 may couple at least one host connector pin DP and DM to at least one memory card connector pin DAT0 and DAT1. Data received through the at least one host connector pin DP and DM from the host device may be transferred to the memory card without a data conversion. Data received through the at least one memory card connector pin DAT0 and DAT1 from the memory card may be transferred to the host device without a data conversion. Accordingly, the memory card 300 may connect the host device performing a wired USB communication with the memory card performing the wired USB communication. Further, the memory card 300 may connect the host device performing the wired USB communication with the memory card performing the memory card communication.

Figure 6:
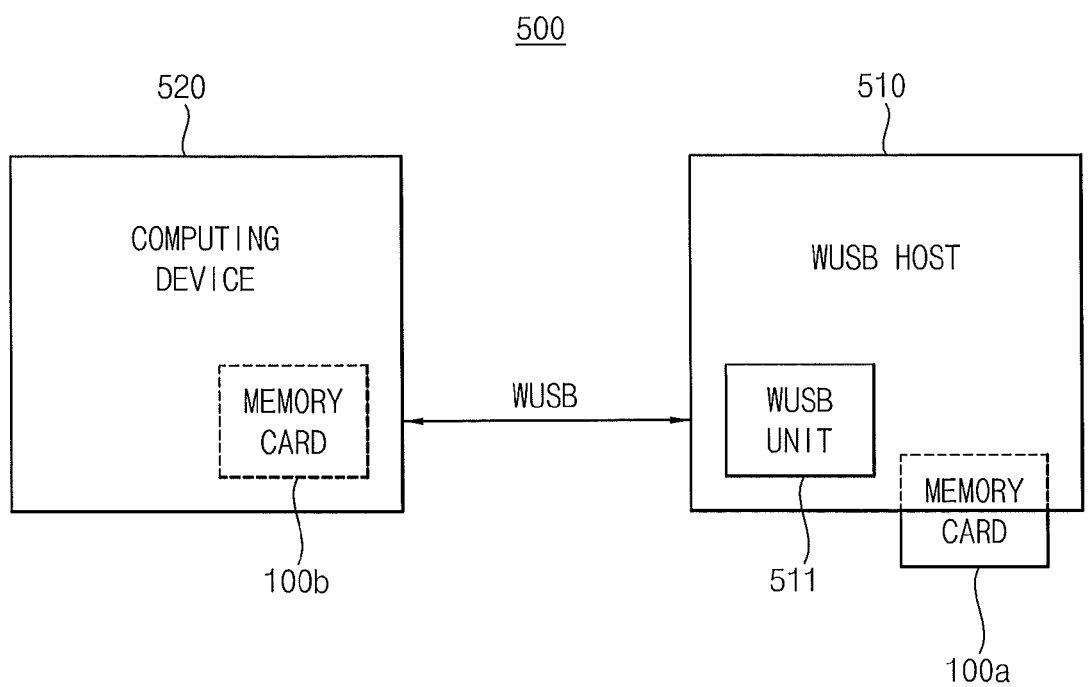
FIG. 6 is a block diagram illustrating a memory card system according to some example embodiments of the present inventive subject matter.

FIG. 6 is a block diagram illustrating a memory card system according to some example embodiments of the present inventive subject matter.

Referring to FIG. 6, a memory card system 500 comprises a WUSB host 510, a computing device 520, and a memory card 100a or 100b. In FIG. 6, 100a indicates the memory card when the memory card is attached to the WUSB host 510, and 100b indicates the memory card when the memory card is attached to the computing device 520.

Each of the WUSB host 510 and the computing device 520 may be a digital camera, a computer, a notebook, a handheld computer, a music player, a game machine, a mobile phone, a smart phone, a personal digital assistant (PDA), a portable multimedia player (PMP), or the like. The memory card 100a or 100b may be a SD card, a MMC, a memory stick, a CF card, a PCMCIA card, a SM card, a UFS, an xD-picture card, or the like.

The memory card 100a may be attached to the WUSB host 510, and may perform a cable association with the WUSB host 510 through a wired USB interface. After the cable association, the memory card 100a may store a connection context including a connection host ID, a connection device ID and a connection key. In some embodiments, a memory card reader 300 of FIG. 4 may be coupled between the WUSB host 510 and the memory card 100a. The memory card reader 300 of FIG. 4 may be coupled to a wired USB port of the WUSB host 510, and the memory card 100a may be coupled to the memory card reader 300 of FIG. 4.

After the cable association, the memory card 100a may be detached from the WUSB host 510, and the memory card 100b may be attached to the computing device 520. The memory card 100b may receive and transmit data from and to the computing device 520 through a memory card interface or the wired USB interface. The memory card 100b may transfer the data received from the computing device 520 to the WUSB host 510 through the WUSB communication. The memory card 100b may perform data encryption/decryption in the WUSB communication with the WUSB host 510 based on the connection context.

The WUSB host 510 may include a WUSB unit 511 that performs the WUSB communication. The WUSB unit 511 may be internal or external to the WUSB host 510. The WUSB host 510 may receive and transmit data from and to the memory card 100b attached to the computing device 520 through the WUSB communication by using the WUSB unit 511. The WUSB host 510 and the computing device 520 may be implemented as two separate devices or a single integrated device.

In the memory card system 500 according to some example embodiments, the memory card 100*b* may transfer data from the computing device 520 to the WUSB host 510 through the WUSB communication while the memory card 100*b* is attached to the computing device 520. Thus, the memory card 100*b* need not be moved from the computing device 520 to the WUSB host 510. Further, in the memory card system 500 according to some example embodiments, because the memory card 100*a* may perform the cable association with the WUSB host 510, the data transferred between the memory card 100*b* and the WUSB host 510 may be protected from being extracted by other devices.

FIG. 7 is a flow chart illustrating operations of a memory card system of FIG. 6 according to some embodiments of the present inventive subject matter.

Referring to FIGS. 1, 6 and 7, an external switch 120 of a memory card 100 may be adjusted to operate the memory card 100 in a wired USB mode (block S610). The memory card 100 may be attached to a WUSB host 510 (block S620). A cable association may be performed between the WUSB host 510 and the memory card 100 (block S630). After the cable association, the memory card 100*a* may store a connection context including a connection host ID, a connection device ID, and a connection key.

After the cable association, the memory card 100 may be detached from the WUSB host (block S640). The external switch 120 of the memory card 100 may be adjusted to operate the memory card 100 in a memory card mode. The memory card 100 may be attached to a computing device 520 (block S650). The memory card 100 may receive data from the computing device 520 through the memory card interface. The memory card 100 may transfer the data to the WUSB host 510 through the WUSB communication (block S660). The memory card 100 may communicate with the WUSB host 510 with which the cable association is performed by performing data encryption/decryption based on the connection context.

As described above, the memory card, the memory card reader, and the memory card system according to some example embodiments of the present inventive subject matter may perform a cable association for the WUSB communication. Further, the memory card, the memory card reader, and the memory card system according to some example embodiments of the present inventive subject matter may be easily implemented with minimum hardware/software design change.

The present inventive concepts may be applicable to any memory card, such as a secure digital (SD) card, a multimedia card (MMC), a memory stick, a compact flash (CF) card, a personal computer memory card international association (PCMCIA) card, a smart media (SM) card, a universal flash storage (UFS), an extreme digital-picture (xD-picture) card, etc., and any memory card reader, such as a SD card reader, a MMC reader, a memory stick reader, a CF card reader, a PCMCIA card reader, a SM card reader, a UFS reader, a xD-picture card reader, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

That which is claimed:

1. A memory card, comprising:
a connector unit comprising a plurality of connector pins;
an external switch configured to generate a mode switching signal;
a mode switch configured to selectively couple at least one connector pin of the plurality of connector pins to a memory card path or to a wired universal serial bus (USB) path in response to the mode switching signal;
a processing unit comprising a memory card interface unit coupled to the memory card path and a wired USB interface unit coupled to the wired USB path, and configured to selectively operate the memory card interface unit or the wired USB interface unit in response to the mode switching signal; and at least one memory configured to store data received through the connector unit;
wherein the processing unit is operable to perform a cable association for a wireless universal serial bus (WUSB) communication with a WUSB host by operating the wired USB interface unit while the memory card is attached to the WUSB host;
wherein the processing unit is operable to perform the WUSB communication to transfer the data stored in the at least one memory to the WUSB host while the memory card is attached to a computing device.

2. The memory card of claim 1, wherein the processing unit further comprises:
a WUSB unit configured to perform the WUSB communication.

3. The memory card of claim 1, wherein the processing unit is operable to generate a connection context by performing the cable association, and is operable to store the connection context in the at least one memory.

4. The memory card of claim 3, wherein the processing unit is operable to perform data encryption and data decryption using the connection context stored in the at least one memory when the processing unit performs the WUSB communication with the WUSB host.

5. The memory card of claim 3, wherein the connection context comprises a connection host ID, a connection device ID and a connection key.

6. The memory card of claim 1, wherein the processing unit further comprises:
an internal memory configured to store memory card firmware for operating the memory card interface unit and wired USB firmware for operating the wired USB interface unit.

7. The memory card of claim 1, wherein the processing unit further comprises:
a register configured to store the mode switching signal received from the external switch.

8. The memory card of claim 7, wherein the register comprises a general purpose input/output (GPIO) register.

9. The memory card of claim 1, wherein the memory card interface unit comprises a secure digital (SD) interface unit.

10. The memory card of claim 1, wherein the connector pins comprise a first data pin, a second data pin, a third data pin, a fourth data pin, a command pin, a clock pin, a power supply voltage pin, a first ground voltage pin, and a second ground voltage pin.

11. The memory card of claim 10, wherein the at least one connector pin comprises the first data pin and the second data pin.

12. The memory card of claim 1, wherein the external switch comprises a switch tab, and is operable to generate the mode switching signal indicating a memory card mode when the switch tab is located at a first position, and to generate the mode switching signal indicating a wired USB mode when the switch tab is located at a second position.

13. The memory card of claim 12, wherein the mode switch is operable to couple the at least one connector pin to the memory card path in response to the mode switching signal indicating the memory card mode, and the processing unit is operable to operate the memory card interface unit in response to the mode switching signal indicating the memory card mode.

14. The memory card of claim 12, wherein the mode switch is operable to couple the at least one connector pin to the wired USB path in response to the mode switching signal indicating the wired USB mode, and the processing unit is operable to operate the wired USB interface unit in response to the mode switching signal indicating the wired USB mode.

* * * * *